May 17, 1966     P. SEIFRIED     3,251,270
RECOIL ABSORBER FOR AN AUTOMATIC WEAPON
Filed March 5, 1964
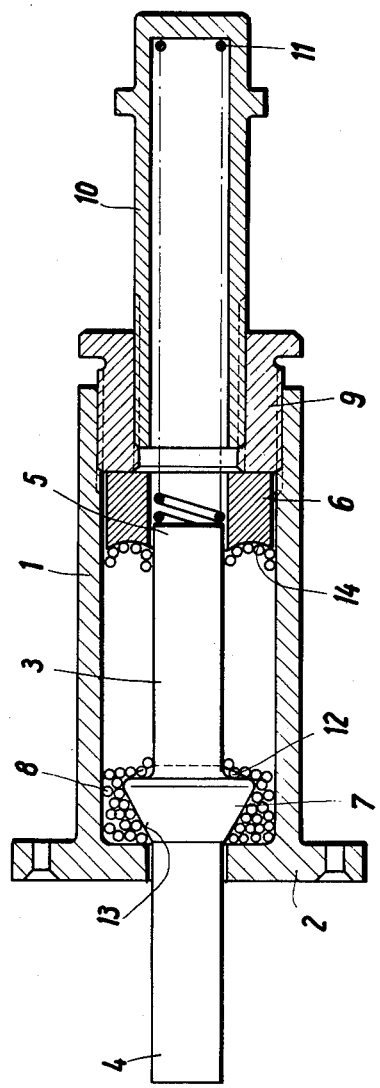
Inventor:
Paul Seifried
By Watson, Cole, Grindle & Watson
Attys.

United States Patent Office 3,251,270
Patented May 17, 1966

3,251,270
RECOIL ABSORBER FOR AN AUTOMATIC WEAPON
Paul Seifried, Badenweiler, Germany, assignor to Firma Rheinmetall G.m.b.H., Dusseldorf, Germany
Filed Mar. 5, 1964, Ser. No. 349,675
Claims priority, application Germany, Mar. 9, 1963, R 34,651
5 Claims. (Cl. 89—177)

This invention relates to a breech block recoil absorber for automatic firearms consisting of a displacement plunger arranged to be slidable in a cylinder filled with a displacement or damping medium. Recoil absorbers serve to nullify the residual energy of the breech block when hurled back and frequently, with the use of restoring means, to initiate the closing process.

Friction and fluid type recoil absorbers, inter alia, have become known for this purpose and, furthermore, also absorbers in which the buffer or shock-absorbing elements consist of rubber or plastic bodies. The known breech-block recoil absorbers of this kind, however, have not always been satisfactory, since their action is affected to a considerable degree both by the ambient temperature or the temperature of the damping medium and by the maintenance received by the weapon.

It is therefore clear that rather large differences in temperature which are due to seasonal or geographical conditions and, for example, may amount to 80° C. or more have an effect in a considerable degree on the damping action and may result in such a case in trouble in the weapon. Thus, for example, leaks in fluid-tight damping devices or variations in the viscosity of the damping fluid may result in faults of operation of the weapon or at least in undesirable variations in the rate of fire. In mechanical friction-type damping devices, for example, jamming may occur and this may likewise result in failure of the weapon to operate or else, at least, impair the intended buffer or recoil-absorbing action. Furthermore, it has been found that in many cases the breech-block recoil absorbers heretofore known do not produce an adequate nullification of the recoil energy of the breech-block mass and this results in an undesirable increase in the rhythm, so that, in conjunction with the manufacturing tolerances and/or the state of maintenance of the weapon and also the ammunition, very different rates of fire are obtained.

The problem posed by the invention is to obviate the drawbacks described above only by way of indication and provide a breech-block recoil absorber which, firstly, is substantially unaffected by variations of temperature and atmospheric influences and, furthermore, also requires practically speaking no maintenance of any kind.

According to the invention, solid, spherical bodies, for example steel balls, are provided as displacement medium in the breech-block recoil absorber. Instead of steel balls, other balls, for example of plastic, may also be employed if required. Furthermore, according to the invention, the balls may be treated with an adhesive permanent lubricant. As an advantageous feature of the invention, the displacement plunger is provided with passages known per se for the balls, it being possible for these passages either to consist of recesses or bores provided in the plunger body or to be formed in that the plunger has a diameter smaller than that of the cylindrical casing surrounding it and determined in dependence on the diameter of the balls.

The invention affords considerable advantages in many respects, both as regards manufacture and operation and, furthermore, also in an economic respect. Apart from surfaces on the recoil absorber pin and plunger and inner surfaces of the cylinder which are smooth to some extent, only tolerances required for operation and which are comparatively coarse have to be observed. Only comparatively coarse tolerances are also required of the balls employed as damping medium, and in fact merely to such extent that they are able to pass through the passages in the displacement plunger with a clearance. The balls may therefore vary in diameter, as long as they comply with the above-mentioned condition. Such balls can be obtained very cheaply on the market.

Owing to the absence of all packing rings or other delicate sealing means, the breech-block recoil absorber according to the invention requires practically speaking no maintenance at all and ensures a substantially constant rate of fire even with markedly varying temperatures or where the condition of the weapon or the ammunition varies because of reasons connected with manufacture or maintenance.

Further details of the invention will appear from the description of the embodiment illustrated in the drawing.

Referring to the drawing, the breech-block recoil absorber forms a self-contained unit which can be inserted as one whole in a rear part of the weapon, for example in automatic rifles in the stock. To this end, the absorber casing (cylinder) 1 has a plate 2 with fixing holes. The absorber pin 3 is arranged to be longitudinally displaceable in the cylinder 1. The front end 4 of the absorber pin projects from the cylinder and serves to intercept the recoiling breech block, while the rear end 5 of the absorber pin is guided in a distance ring 6 arranged in the cylinder. The absorber pin has a displacement plunger 7 in the middle zone of its length. The cylinder contains as displacement medium steel balls 8 with a diameter of, for example, about 1 mm. After the absorber pin has been introduced into the cylinder, these balls are poured into the annular space left around the absorber pin and displacement plunger and, after the distance ring 6 has been fitted, the cylinder is closed by means of a threaded member 9. Into the threaded member there is screwed a sleeve 10 in which a return spring 11 acting on the recoil absorber pin is arranged. The restoring force can be varied by turning the spring sleeve 10.

The diameter of the displacement plunger 7 reduces in the direction of the breech-block to the diameter of the absorber pin, so that in longitudinal section the plunger has a substantially conical form. In many cases, however, depending on the intended shock-absorbing action, it may be appropriate that the rear defining surface of the plunger also be inclined in the direction of the absorber pin. In that case, the plunger has substantially the form of a double cone (illustrated in dash lines), in which, however, the cone formed by said surface is substantially flatter than that pointing towards the breech-block. The plunger surface 12, which is comparatively steep or extends at right angles to the longitudinal axis of the recoil absorber, causes practically complete nullification of the residual energy of the recoiling breech-block, while the recoil absorber spring 11, assisted by the plunger surface 13 at an acute angle to the longitudinal axis, renders an easy return of the recoil absorber pin possible.

As will furthermore be seen from the drawing, the distance ring 6 has on that side thereof which faces the ball filling an arcuate recess 14 by which the rolling process or the flow of the balls is assisted during the movements of the plunger 7.

Of course, the breech-block recoil absorber may also be so designed that the return spring is arranged inside the absorber pin, which in this case is hollow. Furthermore, the breech-block recoil absorber may also be employed without a return spring. To this end, it is merely necessary to provide in manner known per se at the front end of the recoil absorber pin a catching device cooperating with the breech-block and which, as the breech-block runs forward again, carries the absorber pin with it and releases it after a suitable distance has been covered.

What I claim is:

1. A recoil absorber for an automatic weapon comprising in combination, a cylinder, a piston mounted in the cylinder for movement relatively thereto, as a movement damping medium, a plurality of solid spherical bodies, in the cylinder and around said piston, said piston having an absorber pin secured thereto, a sleeve adjustably secured to said cylinder and positioned to slidably receive said absorber pin, and a helical spring in said sleeve acted on and acting upon said absorber pin.

2. A recoil absorber for an automatic weapon comprising in combination, a cylinder, a piston slidably mounted in said cylinder, a movement damping medium in said cylinder in the form of a plurality of solid spherical bodies, a distance ring in an end wall in said cylinder and presenting an annular surface of concave form to the spherical bodies, and a releasable plug screwed into said cylinder for holding said distance ring in a desired position in the cylinder.

3. A recoil absorber according to claim 1, in which a threaded member is provided in screw-threaded engagement with the cylinder and the sleeve to adjust the sleeve relative to the cylinder and thereby adjust the spring.

4. A recoil absorber according to claim 1, in which a distance ring is mounted in the cylinder at one end thereof and having an end curved surface to cooperate with the spherical bodies in the cylinder.

5. A recoil absorber according to claim 1, in which the absorber pin is hollow with the spring projecting into the pin.

References Cited by the Examiner

UNITED STATES PATENTS 3,105,411    10/1963    Browning _____ 89—177

FOREIGN PATENTS 19,344    1912    Great Britain.

BENJAMIN A. BORCHELT, *Primary Examiner.*

FRED C. MATTERN, Jr., *Examiner.*